United States Patent
Chevet et al.

(10) Patent No.: US 6,477,245 B1
(45) Date of Patent: Nov. 5, 2002

(54) METHOD FOR THE MANAGEMENT OF A TELEPHONE AUTOMATIC BRANCH EXCHANGE, EXTERNAL MANAGEMENT DEVICE AND CORRESPONDING AUTOMATIC BRANCH EXCHANGE

(75) Inventors: Jean-Luc Chevet, Laval; Christophe Tatin, Cesson Sevigne, both of (FR)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/399,626

(22) Filed: Sep. 20, 1999

(30) Foreign Application Priority Data

Sep. 25, 1998 (EP) .............................................. 98460040

(51) Int. Cl.[7] .......................... H04M 3/42; H04M 3/00; G06F 12/00; G06F 17/30; G06F 9/46
(52) U.S. Cl. ................................ 379/201.03; 379/9.01; 379/242; 379/269; 707/200; 709/316
(58) Field of Search .................................. 379/242, 268, 379/269, 279, 90.1, 15.01, 201.03; 345/735, 961; 707/102, 200; 709/226, 315, 316; 714/12; 717/136

(56) References Cited

U.S. PATENT DOCUMENTS

| | | | | |
|---|---|---|---|---|
| 4,782,506 A | * | 11/1988 | Sevcik | 379/242 |
| 5,117,372 A | | 5/1992 | Petty | 345/735 |
| 5,386,464 A | * | 1/1995 | Pruitt | 379/242 |
| 5,548,640 A | * | 8/1996 | Blondel et al. | 379/242 |
| 5,568,545 A | * | 10/1996 | Verterinen | 379/269 |
| 5,574,870 A | | 11/1996 | Dziennus et al. | 710/305 |
| 5,729,601 A | * | 3/1998 | Murai | 379/269 |
| 5,822,422 A | * | 10/1998 | Daase et al. | 379/269 |
| 5,870,462 A | * | 2/1999 | Vesterinen | 379/242 |

FOREIGN PATENT DOCUMENTS

| | | | |
|---|---|---|---|
| DE | 40 38 321 A1 | 6/1992 | H04M/3/42 |
| EP | 0 366 341 A2 | 10/1989 | G06F/15/40 |
| EP | 0 810 765 A2 | 5/1997 | H04M/3/54 |

OTHER PUBLICATIONS

"PABX Networks" Electrical Communication vol. 65 No. 1, Jan. 1, 1991 pp. 67–72.
European Search Report, dated Mar. 17, 1999.

* cited by examiner

Primary Examiner—Harry S. Hong (57) ABSTRACT

The invention relates to a method for the management of a telephone automatic branch exchange (11) provided with a management program that makes use of the raw configuration data of a basic configuration enabling its operation. The method comprises a phase of initialization that consists in structuring the configuration into a plurality of objects characterized by parameters and in describing the basic configuration in the form of a raw data base; a phase for the extraction of a configuration diagram that consists in exploring the raw data base so as to prepare a diagram of configuration instructions constituted by a list of configuration instructions; an optional phase for the transfer of the diagram from an external management device to the telephone automatic branch exchange and/or prepare and upload the diagram within the device to store a descriptive condensed image of the current configuration of the telephone automatic branch exchange. The invention also relates to a corresponding external management device and telephone automatic branch exchange.

22 Claims, 4 Drawing Sheets

FIG. 5 51 {
Select A
Select B
Change E 49
Change F 50
Valid
Up
Select D
Change I 200
Change J 201
Up
Up
Select C
Change G 100
Change H 101
Valid
Up

METHOD FOR THE MANAGEMENT OF A TELEPHONE AUTOMATIC BRANCH EXCHANGE, EXTERNAL MANAGEMENT DEVICE AND CORRESPONDING AUTOMATIC BRANCH EXCHANGE

CROSS-REFERENCE TO RELATED APPLICATION

This application claims priority of European Patent Application No.98460040.3, which was filed on Sep. 25, 1998.

TECHNICAL FIELD

The field of the invention is that of telephone systems. The invention can be applied especially to the management of private and/or public telephone automatic branch exchanges. More specifically, the invention relates to a method for the management of a telephone automatic branch exchange, an external management device as well as a corresponding branch exchange.

BACKGROUND OF THE INVENTION

In general, a private automatic branch exchange manages a plurality of objects, geographically distributed within the premises of a firm. Examples of such objects are, for example, voice message mailboxes, telephone sets and answering machines. Each object is characterized by at last one parameter. The manager defines the parameter or parameters of at least certain of the objects and/or he loads and/or saves and/or modifies these parameters. The modification may be used to update the configuration or eradicate the bugs from the configuration of an automatic branch exchange. Configuration bugs of this kind may be the cause of relatively serious malfunctioning that could lead to a dysfunctioning or even the blocking of the automatic branch exchange.

Hereinafter in the present patent document, the term "management" of a telephone branch exchange refers in particular to the following four series of functions:

the functions of loading the configuration in an automatic branch exchange;
the functions of saving the configuration of an automatic branch exchange;
the functions of updating the configuration of an automatic branch exchange;
the functions of remote maintenance of the configuration of an automatic branch exchange.

Hereinafter in the description, the term "manager" will designate a human operator performing at least certain of the above-mentioned functions of management.

There are several distinct known ways of managing an automatic branch exchange. Thus, a first known solution for loading the configuration into an automatic branch exchange, known as the "videotex" (registered mark) system, enables the connection of a Minitel (registered mark) terminal to an automatic branch exchange through a serial link by means of a modem, According to this first approach, a manager types out a textual configuration command on a keyboard of the Minitel (registered mark) and sends this command to the automatic branch exchange to be configured. The textual message is received and then interpreted by the automatic branch exchange to define or modify at least one parameter of an object managed by the automatic branch exchange.

However this first solution is not advantageous.

First of all, it makes it necessary to type the textual commands one by one. Thus, if the manager has to define a large number of parameters, this means that he has to type a corresponding number of commands. The first solution therefore is very cumbersome to implement.

Then, the first solution does not enable the transmission of commands except in one direction, namely from the Minitel to the configuration server of the automatic branch exchange. In other words, it is not possible to retrieve the configuration commands sent to the automatic branch exchange.

Furthermore, since it is not possible to retrieve the transmitted configuration commands, the first solution prevents the remote maintenance of the configuration of an automatic branch exchange, or makes it difficult to carry out this remote maintenance, Finally, the first approach dictates a permanent connection with the concerned telephone automatic branch exchange.

A second known method of loading a configuration into an automatic branch exchange implements a protocol called a "simple network management protocol" on a computer that is connected to an automatic branch exchange to a series link by means of a modem. This protocol is presented for example in the published document RFC 1157 by J. Case, M. Fedor, M, Schoffstall and J. Davin, May 1990.

According to this second approach, a manager has two commands for the remote management of an automatic branch exchange by means of a computer. A first command enables the retrieval of a parameter of an, object and a second command enables this parameter to be modified.

This second approach has several drawbacks.

Indeed, if the manager wishes to modify a large number of parameters, the second approach makes it necessary to perform a large number of processing operations since two operations have to be performed to modify only one parameter. The second approach is therefore cumbersome.

Furthermore, it is impossible for the manager to retrieve all the configuration commands of the automatic branch exchange.

Finally, the second approach requires a permanent connection between the computer and the automatic branch exchange, and this involves major connection costs.

There is also a third known approach providing means for the consultation of the data elements pertaining to the configuration of an automatic branch exchange connected to an automatic branch exchange (locally or at a distance) through a series link by means of a modem.

According to this third approach, a manager may consult raw configuration data of the automatic branch exchange in blocks and therefore memorize raw data of this kind in the form of blocks. The manager can then modify the raw data after having carried out an interpretation of said data.

This third approach also has many drawbacks.

First of all, the manager is obliged to know the memory organization of the data elements in order to access the different parameters before modifying them as the case may be. Such an obligation to know requires the manager to perform a not negligible and even substantial job of analysis and interpretation on the recovered raw data Errors may be inserted following a wrong interpretation and/or modification by the manager. Now, the impact of such errors may give rise to major or even catastrophic malfunctioning for the users of the automatic branch exchange. In certain extreme cases, these errors may lead to a paralysis of the entire system.

Furthermore, it may happen that the manager can modify retrieved raw data only in data blocks. Consequently, the manager can work only on data blocks. This increases his workload since he must interpret an entire block of raw data before being able, if necessary, to modify some of it. Any modification therefore represents an operation that is cumbersome and difficult to implement.

Finally, he must know the exact memory location since the organization of the data blocks must be followed precisely. Indeed, the organization of the raw data, as regards their memory addresses, should not vary in order to avoid any configuration bug.

The three current approaches require substantial time of connection with the automatic branch exchange in order to transfer commands and/or data from or to the automatic branch exchange.

It is impossible to configure an automatic branch exchange off-line,

Furthermore, these approaches do not enable a simple, low-cost implementation of the configuration of an automatic branch exchange without the interpretation of the operation of the automatic branch exchange. Again, it is not possible to preserve the parameters of the current configuration of an automatic branch exchange before updating it, for example in order to install a new version of a configuration program on the automatic branch exchange.

SUMMARY OF THE INVENTION

The present invention is designed especially to overcome these different drawbacks of the prior art. More specifically, one of the goals of the present invention is to provide a method for the management of a telephone automatic branch exchange and a corresponding external management device used to assemble and simplify all the management functions of an automatic branch exchange and to make their uses faster and more flexible.

Another goal of the invention is to provide a method of this kind and a device of this kind used to display at least one portion of the configuration of an automatic branch exchange.

Another goal of the invention is to provide a method of this kind and a device of this kind used to rapatriate or upload at least a part of the current configuration from an automatic branch exchange to said external device.

Another goal of the invention is to provide a method of this kind and a device of his kind to diminish the time of analysis and interpretation of the configuration instructions in order to modify at least certain of the object parameters.

An additional goal of the invention is to provide a method of this kind and a device of this kind to diminish the risk of errors within the configuration commands.

Another goal of the invention is to enable the manager to exercise at least certain of the management functions on an emulated version of the configuration of an automatic branch exchange so as to locally prepare a new configuration which could subsequently be remote loaded into an automatic branch exchange.

Another goal of the invention is to enable the optimizing of the connection time needed to transfer a part or all the configuration commands from or to an automatic branch exchange and therefore to optimize the cost of operation of the link with this automatic branch exchange.

These various goals as well as others which shall appear hereinafter are achieved according to the invention by means of a method for the management of a telephone automatic branch exchange in which the telephone automatic branch exchange is provided with a management program that makes use of the raw configuration data to ensure the operation of said telephone automatic branch exchange, characterized in that the method comprises three main distinct phases of management:

a phase of the initialization of a basic configuration for said telephone automatic exchange;

a phase of the extraction of a configuration diagram representing said basic configuration;

an optional phase for the transfer of said configuration diagram from an external management device to said telephone automatic branch exchange or vice versa;

these being phases in which:

said initialization phase of a basic configuration essentially consists in:

structuring the configuration of said telephone automatic branch exchange in the form of a plurality of distinct objects and/or sub-objects each characterized by at least one parameter;

describing in detail said basic configuration in the form of a raw data base that can be exploited by said program for the management of said telephone automatic branch exchange;

said phase for the extraction of a configuration diagram that represents said basic configuration essentially consists in:

exploring said basic configuration on all or part of said raw data base so as descriptive condensed image of said basic configuration in the form of a configuration instructions constituted by a list of configuration instructions;

said optional transfer phase essentially consists in:

exporting or downloading all or part of said diagram of configuration instructions from said external management device to said telephone automatic branch exchange in order to configure said telephone automatic branch exchange; and/or preparing and uploading all or a part of said diagram of configuration instructions from said telephone automatic branch exchange to said external management device so as to store a partial or full image of said current basic configuration of said telephone automatic branch exchange in storage means accessible from said external management device.

Thus, the invention relies on a novel approach to the management of a telephone automatic branch exchange. Indeed, instead of creating means to manage an automatic branch exchange by offering direct access to the configuration parameters, it is planned to transfer a partial or total reconstituted image of the basic configuration of the automatic branch exchange in the form of a diagram of configuration instructions. This configuration image is reconstituted from a consultation of the raw data of configuration of the automatic branch exchange. This configuration image is prepared during the phase to extraction of a configuration diagram representing the basic configuration. It is this configuration image that will be loaded, saved, modified, and/or updated by the manager. The automatic branch exchange and the external device, for their part, interpret the configuration image, enabling the reconversion of the configuration instructions into raw configuration data that can be exploited by an appropriate management program.

In other words, the main principle of the invention is based on the creation of at least three hierarchical levels of commands, namely a first layer called the upper layer, a second layer of textual configuration commands constituted by configuration instructions and a third layer of commands for the interpretation of these textual commands.

The first layer comprises a macrocommand used during an optional phase of transfer of the configuration instructions diagram. The macrocommand enables a manager to activate a downloading of all or a part of the diagram of instructions of a configuration, from a device, called an external device, which is at a distance from the automatic branch exchange to an automatic branch exchange. The diagram is prepared beforehand by the manager within the to prepare a diagram of external management device or it is retrieved from another automatic branch exchange following an uploading of a part or all of the diagram of instructions of the current configuration as described here below. In reverse, and again by means of the macrocommand, the manager may reconstitute all or a part of the diagram of instructions of the current configuration of an automatic branch exchange and activate an uploading of this totality or part of the reconstructed configuration diagram to an external management device.

The second layer comprises configuration instructions obtained during the phase of extraction of the configuration diagram, the number of which is optimal because these instructions are created from a set of configuration commands that are explicit and appropriate to the operations to be performed on the parameter(s) of the different objects and/or sub-objects. The configuration instructions are furthermore organized according to a defined architecture called a diagram of configuration instructions in keeping with a unique formalism.

The third layer comprises commands enabling the performance, possibly through a lower additional layer, of the textual configuration commands. It is precisely the third layer that is characterizes the parameter or parameters of these different object(s) and/or sub-object(s) of the structure of the configuration. This third layer is used during the phase of initialization of a basic configuration enabling the setting up of a raw data base that can be exploited by the management program of the automatic branch exchange.

It will be noted that the number of objects and/or sub-objects as well as the number of parameters characterizing each object or sub-object in the configuration structure may be any number.

It must also be noted that a simple launching of a macrocommand activates the transfer of a part or the totality of the desired configuration instructions, in the form of a configuration diagram, from an external device to an automatic branch exchange without interrupting its operation. Conversely, i.e. to carry out an uploading of all or a part of the configuration diagram from an automatic branch exchange to an external device, again however with a simple launching of the macrocommand, the activator activates initially the preparation of the desired configuration diagram and, secondly, the transfer of this diagram into storage means enabling the saving of a partial or complete descriptive image of the raw data base.

The connection time pertaining to the uploading of the configuration diagram therefore corresponds to the transfer time of the configuration instructions. It may be recalled, that in the approaches known prior to the invention, this connection time is considerable since the manager must mobilize the connection by issuing a precise question per parameter of object and/or sub-object that it needs to retrieve.

Following the partial or full uploading of the configuration instructions, the manager may reconstitute, especially within the external device, a faithful image of the configuration instructions of the automatic branch exchange since the image has an identical structure and identical values of objects and/or sub-objects and/or parameters. Since the configuration instructions are explicit, the lime of analysis and interpretation of the configuration instructions is reduced. The image of the configuration instructions in particular enables the manager to locally (within the external device) emulate the configuration of the remote automatic branch exchange in order to obtain an image of the configuration of the automatic branch exchange. This image of the operation of the automatic branch exchange, especially through a set of explicit commands, facilitates the analysis of the configuration and therefore any processing to be made on the current configuration of the uploaded automatic branch exchange. It makes it possible especially to detect functional errors in the configuration instructions. The detected functional errors enable the deduction therefrom of the errors committed within the configuration instructions, thus making it easier to detect the required modifications.

Furthermore, the image of the configuration has a simple structure for the presentation of information in such a way that it simplifies the consultation of desired information elements.

Advantageously; at least certain of said objects and/or sub-objects are linked to other said objects and/or sub-objects in a tree structure.

In this way, the tree structure may enable the breakdown, entirely or partially, of the configuration of the automatic branch exchange into sub-divisions which may possibly be hierarchically organized. To do this, the root of the tree structure represents a main object, a ramification represents a sub-object, and sub-ramifications, if any, represent other sub-objects and, finally, one or more terminal branches represent one or more parameters associated with the characterizing of the object.

It will be noted that the invention imposes no constraint on the number of possible levels of possible sub-objects between each object and the parameters characterizing this sub-object.

Advantageously, said raw data base, for each object and/or sub-object, comprises values of said parameters and/or addresses of the objects and/or sub-objects with which said object and/or said sub-object is linked within said tree structure.

In this way, an organization of this kind of the tree structure of the raw data base enables a meshing of the data elements. Consequently, the selection of only one link data element of the tree structure makes it possible, through the simple, successive and recursive inspection of the data of the links adjoining the selected link data, to consult a part or the totality of the basic configuration of the desired automatic branch exchange.

Preferably, said phase for the extraction of a configuration diagram representing said basic configuration essentially consists in:
  exploring said basic configuration on all or part of said tree structure so as to prepare a descriptive condensed image of said basic configuration in the form of a diagram of configuration instructions constituted by a list of configuration instructions.

In this way, the descriptive condensed image of the basic configuration provides a structure for the presentation of the information that is modelled on the tree structure of the raw data base enabling the fast reading of this tree structure, A fast reading operation of this kind is possible because the resulting construction of the image bears a strong correlation with the tree structure of the configuration.

Preferably, there is at least one configuration and transfer macrocommand enabling the activation of the partial or complete transfer of said diagram of said configuration instructions of said telephone automatic branch exchange, from said telephone automatic branch exchange to a device external to said telephone automatic branch exchange or vice versa, in the framework of management functions of said telephone automatic branch exchange, belonging to the group comprising:

- the functions of loading a configuration into a telephone automatic branch exchange;
- the functions of saving the current configuration of said telephone automatic branch exchange;
- the functions of updating the current configuration of said telephone automatic branch exchange;
- the functions of the remote maintenance of the current configuration of said telephone automatic branch exchange.

Thus, a single configuration and transfer macrocommand enables the simplified activation of all the management functions of an automatic branch exchange depending on the context in which it is used.

Furthermore, the performance of these various functions is made faster since the connection times are reduced to the transfer time of the configuration instructions. The costs of running the line between the external device and the automatic branch exchange concerned are therefore reduced.

Furthermore, the performance of all these functions is more flexible for only the use of the configuration and transfer macrocommand is necessary.

Advantageously, for said functions of the loading of a configuration in a telephone automatic branch exchange, said configuration and transfer macrocommand is used in order to:
- at least partially prepare and download said diagram of configuration instructions from said external management device to said telephone automatic branch exchange;
- reconstitute the basic configuration from said downloaded diagram of configuration instructions so as to ensure the configuration of said automatic branch exchange.

It will be understood thus that a manager may prepare a configuration within the external device off-line or locally. Then, once the configuration is ready, depending on possible emulations of different versions of the prepared configuration, a loading of the configuration desired may be made by means of a single activation of the configuration and transfer macrocommand.

It must be noted that a loading of a configuration that a manager is preparing within the external device may also be done simultaneously, on-line (namely during a connection with the automatic branch exchange to be managed), if necessary by means of a macrocommand.

Preferably, for said functions of saving the current configuration of said telephone automatic branch exchange, said configuration and transfer macrocommand is used to:
- at least partially prepare and upload said diagram of configuration instructions from said telephone automatic branch exchange to said external management device;
- reconstitute the basic configuration from said uploaded diagram of configuration instructions and store said reconstituted basic configuration in storage means accessible from said external management device.

Thus, following an uploading of the configuration instructions, the manager may consult the instructions of the current configuration in good rime without having to make a new connection. The manager may furthermore locally recreate an image of the current configuration of the automatic branch exchange.

It must be noted that the storage means may be internal to the external device or else away from the device, for example in a storage zone proper to the means of interpretation of the configuration instructions of the automatic branch exchange without requiring a new connection with the external device.

Following the activation of this macrocommand to upload the configuration instructions, the manager may store them in the memory of the external device, in particular to modify them within the external device. The modification is done on at least certain of the parameters of objects and/or sub-objects characterizing the configuration. This modification may be used especially in order to reinject the modified configuration instructions during a loading of the modified configuration into the same automatic branch exchange. The modification performed makes it possible especially to carry out an updating of the configuration of the automatic branch exchange in question. The modification made may again be used especially to eradicate the detected errors in order to perform the remote maintenance of the configuration of the automatic branch exchange concerned.

Advantageously, for said updating functions of the current configuration of said telephone automatic branch exchange, said configuration and transfer macrocommand is used to:
- at least partially prepare and upload said diagram of configuration instructions, from said telephone automatic branch exchange to said external management device;
- update said diagram of instructions of the current configuration;
- at least partially download said updated diagram of configuration instructions from said external management device to said telephone automatic branch exchange;
- reconstitute the basic configuration downloaded from said diagram of configuration instructions so as to load an updated configuration into said telephone automatic branch exchange.

It will be noted that the updating of the instructions diagram of the current configuration of an automatic branch exchange may result from a reconstitution of the basic configuration followed by an updating of the reconstituted basic configuration and then a preparation of the configuration diagram from the updated basic configuration within the external device. Consequently, the updating may be done in a simple way on a remote site of the automatic branch exchange on which it is planned to update its configuration without being connected with this automatic branch exchange (i.e. in being off-line).

The connection time is therefore reduced to the time needed to download the updated configuration instructions to the concerned automatic branch exchange. By contrast, in the prior art, a simple updating of the configuration is difficult since an updating operation of this kind requires a substantial amount of time to analyze and interpret the data retrieved while at the same time remaining connected with the automatic branch exchange.

Preferably, for said functions of remote maintenance of the current configuration of said telephone automatic branch exchange, said configuration and transfer macrocommand is used to:
- at least partially prepare and upload said diagram of configuration instructions from said telephone automatic branch exchange to said external management device;

modify said diagram of instructions of the current configuration as a function of remote maintenance imperatives;

at least partially download said modified diagram of configuration instructions from said external management device to said telephone automatic branch exchange;

reconstitute the basic configuration downloaded from said downloaded diagram of configuration instructions so as to load a modified configuration into said telephone automatic branch exchange.

It is clear that a configuration may result from additions and/or eliminations of configuration instructions relating to at least one configuration parameter. This modification makes it possible for example, at one and the same local site, to replace an automatic branch exchange by a new automatic branch exchange or again replace the current version of the management program by a new version attached to one and the same automatic branch exchange.

Just as in the case of the updating functions, it is possible for a manager to analyze the configuration instructions of a "malfunctioning" automatic branch exchange within the external device. In other words, the maintenance may be performed on a remote site of the "malfunctioning" automatic branch exchange in order to eradicate its bug or bugs without being connected to the concerned automatic branch exchange. The connection time is therefore also reduced to the time needed to download the modified configuration instructions to the automatic branch exchange concerned.

It will be understood that the modification made on the diagram of configuration instructions may result from a reconstitution of the basic configuration that reveals the errors, a modification of the reconstituted basic configuration enabling the elimination of errors and then a preparation of the configuration diagram modified from the modified basic configuration.

It is clear however that a detection of errors may result especially from a simple observation of bugs appearing on the image of the uploaded current configuration and that a consecutive loading of the configuration instructions, for example in the course of a connection with the automatic branch exchange in question, enables the elimination of the detected errors.

Advantageously, said configuration instructions constituting said diagram of configuration instructions are composed by using a set of available configuration commands, said instructions enabling the association, with each of said objects and/or sub-objects, of said at least one parameter characterizing it.

Preferably, said configuration commands of said set of configuration commands belong to the group comprising:

a command "SELECT" providing for the selection of the object and/or sub-object associated with said command "SELECT":

a command "CHANGE" modifying the value of the parameter of the current object and/or sub-object associated with said command "CHANGE";

a command "VALID" validating the value or values of the defined parameter or parameters associated with the currently selected object and/or sub-object;

a command "UP" providing for the deselection in said structure of the configuration of the currently selected object and/or sub-object.

This list is not restrictive.

Advantageously, said configuration and transfer macrocommand fulfils at least one of the following two functions:

the preparation of said diagram of configuration instructions from an exploration of the basic configuration of said telephone automatic branch exchange;

the downloading or the partial or full uploading of said diagram of configuration instructions from said external management device to said telephone automatic branch exchange or vice versa It must be noted that the manager, from the external device, activates the configuration and transfer macrocommand to perform either:

a downloading of a part or the totality of the diagram of configuration instructions, that had been previously prepared (off-line with respect to the automatic branch exchange to be managed) within the external device by a manager ("TRANSFER" function); and/or a preparing and a simultaneous downloading of a part or the totality of the instructions diagram of the current configuration of an automatic branch exchange during connection with the automatic branch exchange to transmit new configuration instructions to an automatic branch exchange ("TRANSFER" function); and/or a preparing of a part or the totality of the diagram of instructions of the current configuration of an automatic branch exchange followed by its uploading to retrieve the instructions of the current configuration within the external device ("SAVE" function).

The invention also relates to an external device for the management of a telephone automatic branch exchange. An external device of this kind comprises means to implement at least certain of said management functions of an automatic branch exchange described here above.

The term "external management device" designates a device external to the automatic branch exchange enabling the management of this automatic branch exchange.

Advantageously, said external management device furthermore comprises:

means for the interpretation, updating and/or modification of a diagram of current configuration instructions of a telephone automatic branch exchange transferred into said external management device by means of said configuration and transfer macrocommand; and/or means for the reconstitution of a part or all of the basic configuration of said telephone automatic branch exchange from said diagram of configuration instructions, and for the updating and/or modification of said reconstituted basic configuration;

means to prepare said diagram of configuration instructions from an exploration of the saved and/or updated and/or modified basic configuration (60) of said telephone automatic branch exchange.

Since the, external device comprises means for the interpretation of a diagram of configuration instructions, a manager may locally recreate an exact image of the configuration of the remote automatic branch exchange. Such a characteristic also makes it possible to prepare and define a diagram of configuration instructions off-line. This diagram of configuration instructions can then be remote-loaded at a later date into an automatic branch exchange.

Indeed, the manager can implement the means of interpretation to obtain an emulation of the prepared or uploaded configuration in order to diagnose malfunctions, if any, in order to eradicate then?. The time needed for troubleshooting is considerably smaller than in the prior art, for no prior art solution emulates all or part of the current configuration of an automatic branch exchange <<locally >>namely within an external management device.

Thus it is possible, within the external device, to have an architecture identical to chat of an automatic branch exchange so that this external device can carry out a part or the totality of the instructions of its current configuration in a manner similar to this automatic branch exchange.

Preferably, said external management device furthermore comprises means for the storage of the partial or complete basic configuration of said telephone automatic branch exchange designed to be loaded and/or saved and/or updated and/or modified.

A characteristic of this kind enables the saving "in memory" within the external management device of a faithful image of at least a part or the totality of the current configuration of an automatic branch exchange.

Advantageously, said external management device is connected to a telephone automatic branch exchange through a serial link and/or telephone link and/or Ethernet link.

In a preferred embodiment of the invention, said external management device is integrated into a dedicated configuration computer or into another telephone automatic branch exchange.

It will be understood that it may also be of utility to connect this external device to two automatic branch exchange devices, namely:

a first automatic branch exchange whose configuration has no bug, in order to recover the diagram of instructions of the current configuration of this first automatic branch exchange;

a second automatic branch exchange, distinct from the first automatic branch exchange, whose configuration has at least one bug and/or one imperfection.

Indeed, a manager using the external device can activate the configuration and transfer macrocommand in order to retrieve at least one part of the diagram of configuration instructions of the first automatic branch exchange (in the case of uploading). Then, the manager, as the case may be, depending on the operating requirements of the second automatic branch exchange, may adapt at least certain of the configuration instructions uploaded from the first automatic branch exchange and reinject these instructions, at least partly, into the second automatic branch exchange. To do so, the manager activates (this is the case of downloading) the transfer and configuration macrocommand for a second time in order to eradicate the bugs and/or perfect the configuration of the second automatic branch exchange.

The invention also relates to an automatic branch exchange of the type designed to implement the method described here above.

Other characteristics and advantages of the invention shall appear from the following description of a preferred embodiment of the invention, given by way of a simple illustrative and non-restrictive example, with reference to the appended drawings.

DETAILED DESCRIPTION

Figure 1:
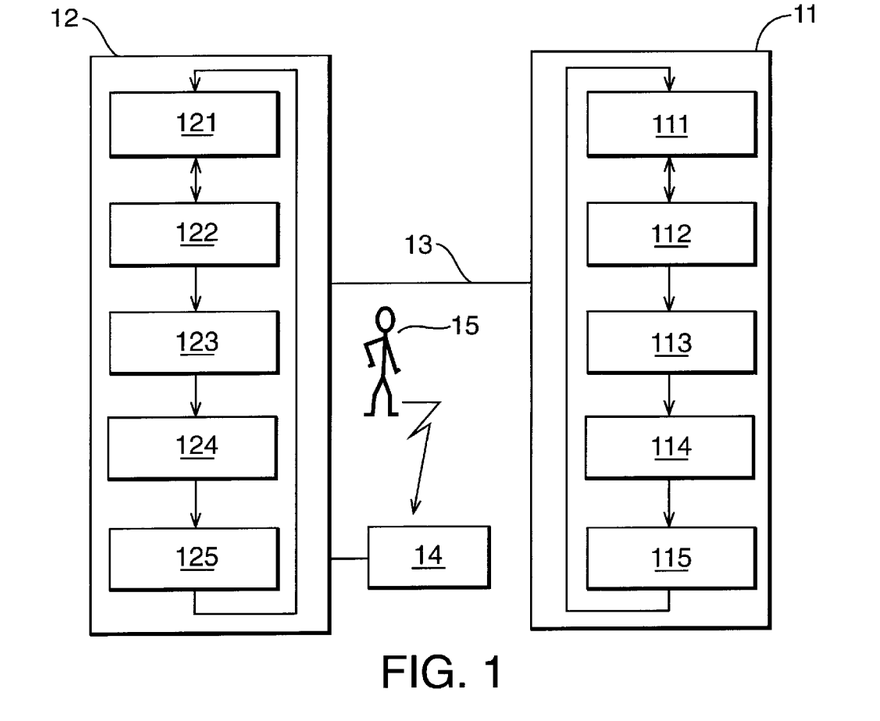
FIG. 1 shows a simplified diagram of an external device for the management of a telephone automatic branch exchange linked to a telephone automatic branch exchange between which it is possible to implement the method according to the invention for the management of a telephone automatic branch exchange.

A description is now given, with reference to FIG. 1, of an external device for the management of a telephone automatic branch exchange connected to a telephone automatic branch exchange between which it is possible to implement the method according to the invention for the management of a telephone automatic branch exchange.

We shall consider a single automatic branch exchange 11 to be configured. This exchange 11 Is contained in a telephone network.

In a conventional way, the automatic branch exchange ii comprises means 115 for the storage of the basic configuration. These means 115 memorize raw data associated with the configuration of the automatic branch exchange II itself. This raw data forms the << basic configuration >> of the automatic branch exchange 11.

Conventionally again, the raw data of the configuration represents values assigned o parameters characterizing each object managed by the automatic branch exchange 11. As objects, we may cite by way of example:

the dates;
the users
the user terminals;
ISDN or similar lines;
the list of users managed by the automatic branch exchange;
the "direct input dialling" numbers;
the classes of restrictions;
the numbering plan (namely the definition of the functions associated with the telephone set key depressing sequences).

For certain objects, it is possible to combine certain parameters, according to certain criteria into sub-objects. It is possible in particular to cite, as objects, "users" each characterized by sub-objects such as "user terminals". This example entails the assigning of:

an identifier to each user, such as the name of the user;
a number to each user terminal associated with the designated user object Each of these "user terminals" sub-objects comprises at least one parameter to be defined such as fees. Fees such as these enable the automatic branch exchange 11 especially to authorize or prohibit certain actions requested by the calling user.

It is clear that the number of objects, the number of associated sub-objects and the number of parameters attached to an automatic branch exchange may have any values whatsoever.

According to the invention, the automatic branch exchange II comprises means III for implementing management functions. The automatic branch exchange II furthermore comprises:

means 112 for the interpretation of a diagram of configuration instructions of an automatic branch exchange transferred into the automatic branch exchange 11, possibly by means of a configuration and transfer macrocommand "SAVE" delivering a diagram of configuration instructions to:

means 113 for the reconstitution of the basic configuration of the automatic ranch exchange in the form of a raw data base from the transferred diagram of configuration instructions. These means 113 of reconstitution deliver raw (or binary) data to:

means 114 for the storage of the basic configuration of the automatic branch exchange is 11 that store all these raw data elements. The automatic branch exchange 11 has a management program that uses and exploits such raw data elements to enable its operation.

A detailed explanation of an implementation of these different means is described further below with reference to FIGS. 3a and 3b.

According to an essential characteristic of the invention, there is at least one configuration and transfer macrocommand enabling the activation of the partial or complete transfer of the diagram of configuration instructions of the telephone automatic branch exchange 11 from the telephone automatic branch exchange 11 to an external device 12 or vice versa, in the context of management functions of the telephone automatic branch exchange 11. As management functions of the automatic branch exchange 11, we may cite for example:

the functions of the loading of a configuration into a telephone automatic branch exchange 11;

the functions of the saving of the current configuration of the telephone automatic branch exchange 11;

the functions of the updating of the current configuration of the telephone automatic branch exchange 11;

the functions of the remote maintenance of the current configuration of the telephone automatic branch exchange 11.

These four series of functions shall be described in greater detail with reference to FIGS. 3a and 3b.

A single macrocommand called a configuration and transfer macrocommand enables a manager to carry out the activation, transparently with respect to the manager, of a transfer in one direction (from the external management device 12 to the automatic branch exchange 11) as well as in the opposite direction (from the automatic branch exchange 11 to the external management device 12). In other words, for this purpose, the manager, prior to the request for transfer of the configuration, needs to know neither the configuration instructions nor the structure of the configuration of the automatic branch exchange 11 nor the address of the memory location of these configuration instructions.

A useful advantage of a configuration and transfer macrocommand of this kind is the ability to carry out the remote loading of the configuration instructions from the external device 12 into the automatic branch exchange ii in a simple and fast manner without disturbing the operation of this automatic branch exchange 11.

This device 12 for the management of an automatic branch exchange external to the automatic branch exchange 11 is connected to the automatic branch exchange 11 via a serial link 13 by means of a modem (not shown).

It will be noted that this serial link 13 enables the transfer firstly of the configuration and is transfer macrocommand described in detail further below and secondly the transfer, at least partially, of the configuration instructions diagram in both directions, namely from the external device 12 to the automatic branch exchange 11 and from the automatic branch exchange 11 to the external device 12.

According to one alternative embodiment, the external management device 12 is connected to the automatic branch exchange 11 through a telephone link.

According to another alternative embodiment, the external management device 12 is connected to the automatic branch exchange 11 through an Ethernet link.

The external management device 12 is designed to be in a dedicated configuration computer connected to a keyboard 14 on which a manager 15 activates the configuration and transfer macrocommand, According to one alternative embodiment, it is possible to envisage replacing the manager by a management application provided in the external management device 12, locally or remotely with respect to the automatic branch exchange involved. This application would carry out a predetermined and automatic activation, for example at a precise date and hour, of the "remote loading" of the diagram of the configuration instructions.

According to one alternative embodiment, the external management device 12 is integrated into another automatic branch exchange (not shown) that is distinct from the automatic branch exchange 11 on which the manager 15, through the activation of the (configuration and transfer) macrocommand, has in particular downloaded a part or all of a diagram of configuration instructions for a automatic branch exchange in the manner described further, below (cf. FIG. 2). Assuming that the external management device 12 has access to two automatic branch exchanges (for example the one into which it is integrated called the second automatic branch exchange and an external automatic branch exchange called the first automatic branch exchange), then the manager 15, from the external management device 12, may for example partially or totally upload the diagram of configuration instructions from the first automatic branch exchange to the external management device 12. To do this, the manager 15 activates the configuration and transfer macrocommand a first time to save the partial or complete image of the diagram of configuration instructions of the first automatic branch exchange within the external management device 12. Then the manager 15, again from the external management device 12, may activate the configuration and transfer macrocommand a second time to download the part or the totality of the saved diagram of configuration instructions to the second automatic branch exchange. One of the aims of this twofold activation of the macrocommand may, for example, be to make a faithful copy, in the second automatic branch exchange, of a part or all of the diagram of configuration instructions of the first automatic branch exchange that enables an optimum functioning of the first automatic branch exchange (according to conditions of operation that are identical or similar to the conditions of operation to be observed by the second automatic branch exchange).

Just like the automatic branch exchange I 1, the external management device 12 comprises, according to the invention, means 121 for the implementation of management functions. These are means 121 for the implementation of management functions which in particular interpret and execute the configuration and transfer macrocommand. The external device 12 may therefore at least partly implement the same functions as the automatic branch exchange 11.

The external management device 12 furthermore comprises especially:

means 122 for the interpretation, updating and/or modification of a current diagram of configuration instructions of an automatic branch exchange 11 transferred into the external management device 12 by means of the configuration and transfer macrocommand. These means 122 deliver a configuration instructions diagram prepared and/or updated and/or modified by the manager 15;

means 123 of reconstitution and/or updating and/or modification of a part or all of the basic configuration of the automatic branch exchange I 1. enabling the conversion 11 of each configuration instruction of the diagram of configuration instructions into binary data. These means 123 of reconstitution supply binary data to means 124 for the storage of the partial or complete basic configuration of the automatic branch exchange 11 storing the binary data of the configuration representing the converted configuration instructions. These storage means 124 enable the saving, in the memory, of the image of the current configuration of the automatic branch exchange 11 or the image of a configuration recently defined by the manager, in order to test it, before any direct downloading to an automatic branch exchange. The storage means 124 supply binary data to means 125 for the preparation of the diagram of configuration instructions which reconstruct the diagram of configuration instructions through an exploration of the basic configuration saved and/or updated and/or modified before remote-loading the diagram of configuration instructions prepared in the automatic branch exchange 11.

The interpretation means 122, reconstitution means 123 and storage means 124 make it possible especially to emulate the configuration of the automatic branch exchange 11, for which the current configuration within the external device 12 has been partly or completely uploaded before being remote-loaded and/or updated and/or modified.

The external management device 12 therefore has an arrangement of means similar to that of the automatic branch exchange 11. The configuration instructions are interpreted and converted in the same way, by both the external management device 12 and the automatic branch exchange 11, thus facilitating the remote processing of the diagram of instructions of the current configuration of an automatic branch exchange. furthermore, the configuration and transfer macrocommand activated from the external management device 12 is interpreted and performed in a complementary manner by the automatic branch exchange 11 and the external device 12. In other words, when the diagram of configuration instructions is sent from the automatic branch exchange 11, the external device 12 expects to receive it and vice versa. Consequently, a complementarily of this kind in the interpretation and performance of the macrocommand enables an easy transfer of the configuration instructions in one direction as well as in the other (the case of a downloading and that of an uploading of a diagram of configuration instructions).

The present invention therefore proposes a simple and efficient architecture to make this external device 12 for the management of an automatic branch exchange 11.

It is indeed possible to modify the configuration instructions locally, within the external management device 12, by means of an appropriate application. The modification is then tested in order to display its consequence or consequences. According to the results obtained during the test, other possible modifications may be made. It must be noted that this modification or modifications may be made without using the series link 13 because the manager can perform the tests locally (namely within the external management device 12 especially by an emulation of each test).

Figure 2:
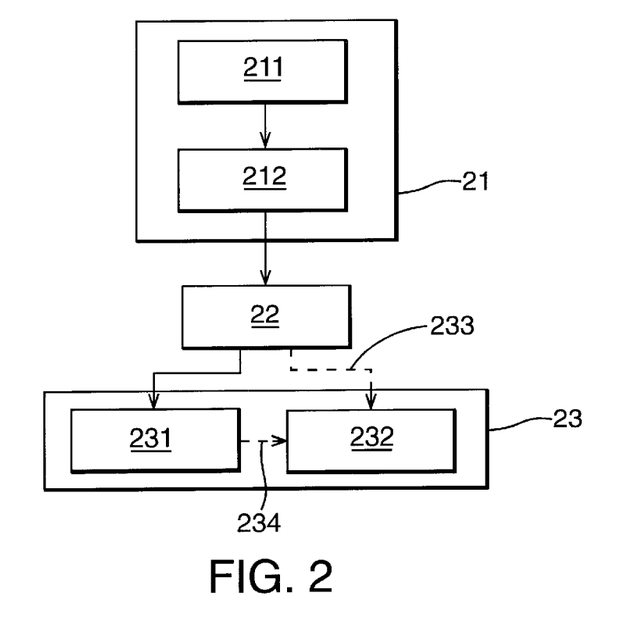
FIG. 2 is a simplified flow chart of a particular operating mode of the method according to the invention for the management of a telephone automatic branch exchange.

Referring to FIG. 2, a description now follows of a simplified flow chart of a particular operating mode of the method according to the invention for the management of a telephone automatic branch exchange.

It is possible in particular to distinguish three distinct main phases that are characteristic of the method for the management of a telephone automatic branch exchange according to the invention:

a phase 21 to initialize the basic configuration of the telephone automatic branch exchange;

a phase 22 for the extraction of a configuration diagram representing the basic configuration;

an optional phase 23 for the transfer of the configuration diagram from an external management device to the telephone automatic branch exchange, or vice versa.

The above-mentioned phases 21 and 22 are essential to the making of the invention. The core of the invention is formed by the second one of these phases (phase 22). Indeed, the principle of the invention is based on the extraction of a condensed image from the basic configuration, called a diagram of configuration instructions. The diagram consists of a list of configuration instructions. Each instruction comprises a command and possibly the name of the object and/or sub-object processed and/or the value of the associated parameter.

The condensed image is an efficient and elegant way of achieving a certain number of goals:

it makes it easier to handle the configuration of the automatic branch exchange (for example to analyze and/or import and/or download and/or update and/or modify it);

it makes this handling faster (especially for transfers). It must indeed be noted that the connection time between the external management device and the automatic branch exchange corresponds to the time needed for the transfer of the part or the totality of the diagram of configuration instructions prepared within the external device or the automatic branch exchange;

this enables the defining of a format for the structure of the information in the descriptive condensed image that facilitates access to any desired configuration element, for example to verify, correct and/or update it. In other words, through its presentation, the configuration is more accessible as shall be seen in detail with respect to FIG. 5;

it makes it possible to take an exact image of the configuration without interrupting the operation of the automatic branch exchange. This exact image, although condensed, is for example advantageously exploited (analyzed, updated, reimported into an automatic branch exchange) by means of an external management device;

it makes it possible to have a single handling format (the format defining the configuration diagram) which may be compatible with different structures of the basic automatic branch exchange configuration. The only constraint associated with this aptitude for compatibility is the need to have appropriate conversion means to reconstitute the basic configuration from the condensed image and, conversely, means to prepare the diagram of configuration instructions from an inspection of the basic configuration;

this furthermore leads to the development of a specific and original macrolanguage (see the commands SELECT, CHANGE, etc. which shall be described in detail further below) used to prepare the diagram of configuration instructions and handle it. This set of commands comprises a-limited number of explicit and generic commands. This facilitates the analysis and interpretation and therefore the speed with which these operations are performed.

In order to enable this extraction, the basic configuration must however comply with a certain constituent formalism. It is this formalism that is the object of the above mentioned phase, 21:

the basic configuration must contain (211) all the objects and/or sub-objects constituting the configuration of the automatic branch exchange in associating, with each object and/or sub-object, the parameters that characterize it;

it must be composed 212 in the form of a base of raw data that is exploitable and can be interpreted by the management program of the telephone automatic branch exchange;

this configuration must be structured in a form such that it can be explored methodically. It is through an operation of methodical operation such as this that it will be possible to prepare the condensed image of this configuration (namely the diagram of configuration instructions). Preferably, the structure of the basic configuration is a tree structure. This tree structure enables the definition of the hierarchical links between the different objects and/or sub-objects managed by the automatic branch exchange. Thus, the selection of an object and/or a sub-object makes it possible to retrieve all the objects and/or sub-objects of the tree structure, for example by means of a recursive procedure.

The third phase 23 mentioned here above is a major characteristic of the invention since it deals with the possibility of constructing and transferring the condensed image to:

either upload it from an automatic branch exchange to the external management device (for example to analyze, correct and/or update its configuration by means of an external device);

or download it from the external device to an automatic branch exchange (if necessary after analysis and modification of the diagram of configuration instructions) in order to configure or reconfigure the automatic branch exchange. The case of a reconfiguration may indeed arise after a stoppage followed by a restarting of the automatic branch exchange, the diagram of instructions of the configuration having, prior to this stoppage,,been saved and then downloaded from the external management device 12 to the automatic branch exchange 11 in order to restore the previous configuration. This restoring of configuration is therefore facilitated for it requires only two simple uses of the configuration and transfer macrocommand. A restoration of this kind is useful especially if there should be a change in the management program on the automatic branch exchange 11 concerned.

Referring to the diagrammatic drawing of FIG. 2, the optional transfer phase 23 essentially consists in:

downloading (231) all or part of the diagram of configuration instructions from the external management device to the telephone automatic branch exchange in order to configure the telephone automatic branch exchange. Thus, the partial or complete diagram of configuration instructions may be downloaded following a local job and without requiring a permanent connection with the automatic branch exchange. In other words, the downloading of the partial or complete diagram of instructions may be deferred (or done off-line) at any time after this diagram has been prepared; or 233 preparing 232 and uploading all or a part of the diagram of configuration instructions, from the telephone automatic branch exchange to the external management device, so as to store a partial or full image of the current basic configuration of the telephone automatic branch exchange in storage means accessible from the external management device. Through the saving of the partial or complete image of the basic configuration of the automatic branch exchange, an operator may reproduce and possibly modify a part or all of the diagram of configuration instructions locally.

According to one alternative mode, the step 231 for the downloading of a partial or complete instructions diagram (described here above) precedes (as symbolized by the arrows 234), the step 232 for the preparing and uploading of a part or all of the diagram of configuration instructions of the telephone automatic branch exchange. This enables an operator, for example firstly to configure a part of the automatic branch exchange and secondly to consult another part of the configuration before possibly taking a step of analysis of this other part. This analysis precedes any function of management of the automatic branch exchange concerned and/or another automatic branch exchange, orchestrated from the external device.

Figure 3A:
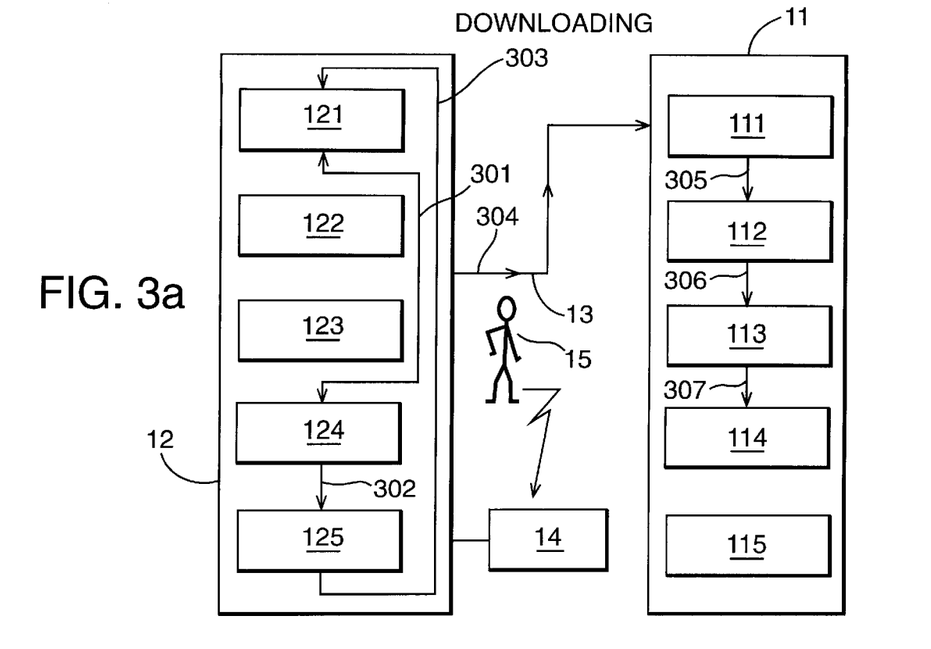
FIGS. 3a and 3b each show a simplified diagram enabling the detailed explanation of a particular mode of a use of a configuration and transfer macrocommand of the method of FIG. 2.
Figure 3B:
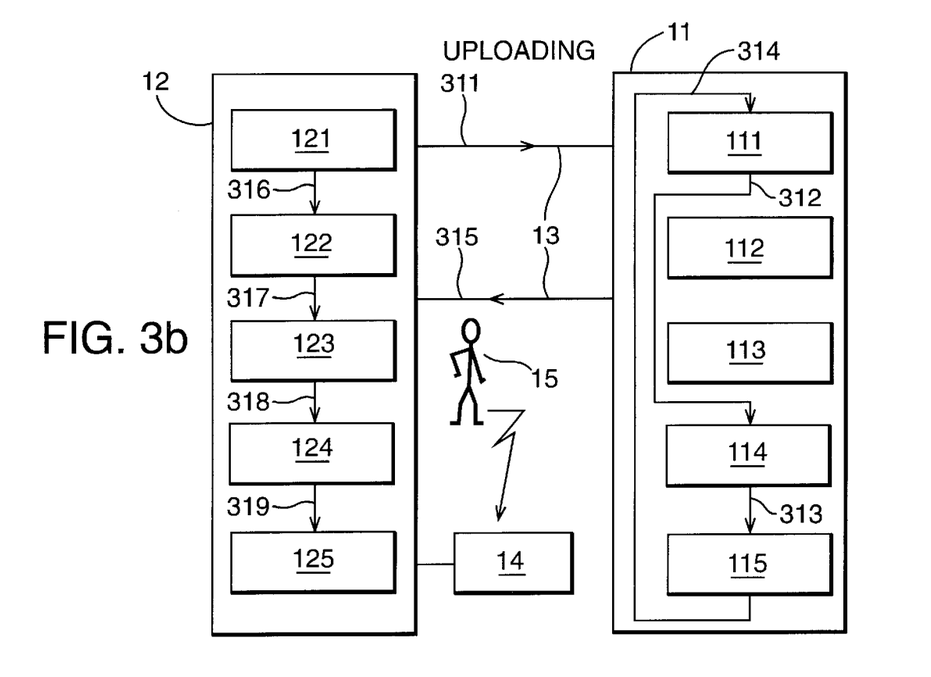

A description is now given with reference to FIGS. 3a and 3b each comprising a simplified diagram that explains a particular mode of a use of the configuration and transfer macrocommand of the method described here above.

The schematic structure of FIG. 1 is taken up again.

It must be noted that the manager 15, for the use of the configuration and transfer macrocommand, works only within the external device 12 of management. This means that the manager 15 activates the macrocommand, for example from the keyboard 14 or a mouse (not shown) connected to the external device 12.

An explanation is given here below, with reference to FIG. 3a, of a first particular mode of a use of the configuration and transfer macrocommand (in the case of a downloading).

It is assumed first of all that the manager 15 has first of all defined a diagram of configuration instructions, possibly after one or more versions of diagrams of configuration instructions emulated within the external device 12.

According to one alternative operating mode, the manager 15 has first of ail, according to the operating mode described in detail here below (see FIG. 3b), saved a part or the totality of the diagram, of configuration instructions of an automatic branch exchange by means of the saving of raw data of the partial or complete basic configuration in the storage means 124.

The manager 15 for example selects a first predetermined key of the keyboard 14 which corresponds to the activation of the configuration and transfer macrocommand "SAVE".

According to one alternative mode of operation, the manager 15, by selecting a first icon of the screen by means of a mouse (not shown), activates the configuration and transfer macrocommand "SAVE".

Following the activation of the macrocommand "SAVE", the means 121 for implementing management functions interpret and execute the configuration and transfer macrocommand. This macrocommand controls the complete downloading of the diagram of configuration instructions to be transmitted from the external management device 12 to the automatic branch exchange 11. To do this, the means 121 deliver an output signal 301 to the means 124 for the storage of the basic configuration. A signal 301 of this kind commands the storage means 124 to deliver the binary data elements to the means 125 for preparing the configuration instructions diagram. The binary data elements corresponding to the diagram of configuration instructions to be transmitted are retranscribed into configuration instructions (by using the macrolanguage commands described further below) by means 125 for preparing the diagram of configuration instructions. The configuration instructions prepared are transmitted 303 to the means 121 for implementing the management functions. The diagram of configuration instructions prepared is then sent, through the series link 13, in the direction 304, to the automatic branch exchange 11. It must be noted that a downloading of this kind of the diagram of configuration instructions requires no permanent connection and causes no blocking of the automatic branch exchange 11 and lasts for the transfer time of the configuration instructions of the diagram.

The means 111 for implementing management functions make use of a first call 305 to transfer the diagram of configuration instructions to the means 112 for interpreting the diagram of configuration instructions. These interpretation means 112 interpret the configuration instructions in order to configure the automatic branch exchange 11 and then, through a second call 306, transfer the configuration instructions to the means 113 for reconstituting the basic configuration of the automatic branch exchange 11. These reconstitution means 113 transcribe the diagram of configuration instructions into binary data elements and, through a third call 307, transmit the binary data elements to the means 114 for the storage of the basic configuration. The means 114 for the storage of the basic configuration keep ready all the executable binary data elements of the configuration. This enables the generation of an image for the configuration of the automatic branch exchange 11. This image defines firstly the structure of the configuration and secondly the parameters attached to the automatic branch exchange 11. The image defined in this way becomes the current configuration of the automatic branch exchange 11.

In short, for the functions of loading a configuration into an automatic branch exchange 11, the configuration and transfer function is used to:

prepare and at least partly download the diagram of configuration instructions from the external device 12 to the automatic branch exchange 11. This preparation may result in particular either from a definition made by the manager 15 or from a preliminary saving of a diagram of configuration instructions of a distinct automatic branch exchange (not shown) by means of a corresponding saving of binary data elements in the storage means 124 accessible from the external management device 12;

reconstitute, within the automatic branch exchange 11, the basic configuration downloaded from the diagram of configuration instructions so as to provide for the configuration of the automatic branch exchange 11, An explanation is given here below, with reference to FIG. 3b, of a second particular mode of a use of the configuration and transfer macrocommand (in the case of an uploading).

It is assumed that a manager has configured the automatic branch exchange 11 beforehand according to the operating mode described here above. Consequently, the storage means 114 store executable binary data elements corresponding to the current basic configuration of the automatic branch exchange 11.

The manager 15 selects a second predetermined key of the keyboard 14, which corresponds to the activation of the configuration and transfer macrocommand <<SAVE>>.

In the same way as in the case of the downloading of a diagram of configuration instructions, the manager 15 may activate the macrocommand <<SAVE>> by selecting a second icon on the screen by means of a mouse (not shown).

The means 121 for the implementation of management functions interpret and execute the macrocommand <<SAVE >> by asking the automatic branch exchange 11, through the series link 13 in the direction referenced 311, to transfer a part or the totality of the diagram of configuration instructions corresponding to the partial or complete basic configuration of the automatic branch exchange 11.

The means 111 for the implementation of management functions receive the macrocommand "SAVE" and, after an appropriate interpretation, perform the macrocommand "SAVE" for uploading the entire diagram of configuration instructions from the automatic branch exchange 11 to the external management device 12. To do this, the implementation means 111 use a first connection 312 to address the storage means 114 of the basic configuration.

According to one alternative mode of operation, using for example a selection of a part of the diagram. of instructions of the current configuration, only one part of the diagram can be uploaded. The selection of a part of the diagram of instructions of the current configuration is done within the external management device 12, for example by taking position on the object or sub-object associated at the beginning with the part of the desired diagram of configuration instructions.

The storage means 114, through a second connection 312, transfer the executable binary data corresponding to a part or to the entire diagram of instructions of the current configuration to the means 115 for preparing the diagram of configuration instructions. These preparing means 115 explore the saved and/or updated and/or modified configuration of the automatic branch exchange and reconstruct a part or the totality of the desired diagram of configuration instructions. This diagram is transferred through a third connection 314 to the means of implementation of the management functions. Then, the automatic branch exchange 11 transfers the diagram of configuration instructions obtained at the external device 12, through the series link 13, in the direction referenced 315.

The means 121 for implementing the management functions transmit the transferred diagram of configuration instructions through a fourth connection 316, to the interpretation, updating, and/or modification means 122. These modification means 122 interpret and execute the configuration instructions in order to simulate a part or all of the current basic configuration of the automatic branch exchange ii and then, through a fifth connection 317, transmit the configuration instructions of the diagram to the means 123 for reconstituting the basic configuration of the automatic branch exchange. These means 123 use configuration instructions to reconstitute the partial or complete current basic configuration of the automatic branch exchange 11 designed to be loaded and/or saved and/or updated and/or modified. Then, the reconstitution means 123 use a sixth section to deliver the resulting executable binary data to the storage means 124.

The storage means 124 store the image of the uploaded current configuration of the automatic branch exchange 11.

In short, for the functions of saving the current configuration of the automatic branch exchange 11, the system uses the configuration and transfer macrocommand to:

at least partially prepare and upload the diagram of configuration instructions from the automatic branch exchange 11 to the external device 12;

reconstitute the basic configuration from the uploaded diagram of configuration instructions and store the reconstituted basic configuration in storage means accessible from the external device 12. This storage may in particular be used to configure the same automatic branch exchange 11 subsequent for example to the changing of the management program of the automatic branch exchange 11.

The diagram of instructions of the current configuration may again for example be used for purposes of functions of updating and/or remote maintenance of the current configuration of the automatic branch exchange ii and/or another automatic branch exchange (not shown).

Preferably, for the functions of updating the cumnt configuration of the automatic branch exchange 11, the configuration and transfer macrocommand "SAVE" is used for a first time to:

at least partially prepare and elaborate the diagram of configuration instructions from the automatic branch exchange 11 to the external device 12. The upload diagram of configuration instructions corresponds to a partial or complete descriptive image of the current basic configuration of the automatic branch exchange 11;

update, as a function of the updating imperatives, at least certain binary data of the partial or complete image of the basic configuration constructed within the external device on the basis of the diagram of upload configuration instructions. To do so, the manager locally uses configuration instructions prepared from a set of configuration controls described further below with reference to FIG. 5. After each operation for the updating of the image of the basic configuration relating to a part of the updating to be performed, it is useful to display the consequences especially by carrying out the emulation of the partially updated basic configuration to be certain of obtaining the described partial effects. In this way, it is possible to proceed by steps to obtain a construction of the complete updating to be done before checking, as the case may be, to ascertain that this construction generates all the effects desired; the configuration and transfer macrocommand "SAVE" is used a second time to:

prepare the diagram of configuration instructions corresponding to the current state of the updated basic configuration;

at least partially download the diagram of updated configuration instructions from the external device 12 to the automatic branch exchange 11;

reconstitute the basic configuration from the diagram of downloaded configuration instructions so as to load an updated basic configuration into the automatic branch exchange. To do this, it is possible especially to work as explained here above with reference to FIG. 3a.

Again preferably, for functions of remote maintenance of the current configuration of the automatic branch exchange 11:

the configuration and transfer macrocommand "SAVE" is used for a first lime to:

at least partially prepare and upload the diagram of configuration instructions from the automatic branch exchange 11 to the external device 12. This is therefore the diagram of instructions of the current configuration of the automatic branch exchange for which it is sought to eliminate the malfunctions detected and presented by the external device 12;

as a function of remote maintenance imperatives, modify at least certain of the binary data of the partial or complete image of the basic configuration reconstructed within the external device from the upload diagram of configuration instructions. This modification is made possible through the local use of the configuration instructions. These configuration instructions are prepared from a set of configuration commands described further. below with reference to FIG. 5. After each modification of the base image of the basic configuration, it is important to display the consequences especially by carrying out the emulation of the modified basic configuration in order to ascertain that the proposed modification generates an eradication of the malfunctions detected. If not, the manager 15 must perform at least one new modification which will be the object of a possible new emulation or possible new emulations. It is clear that the manager 15 will make as many successive modification(s) and emulation(s) as are needed to eliminate the detected malfunction;

the configuration and transfer command "SAVE" is used a second time to:

prepare the diagram of configuration instructions corresponding to the current stare of the modified basic configuration;

at least partially download the diagram of modified configuration instructions from the external device 12 to the automatic branch exchange 11;

reconstitute the basic configuration from the downloaded diagram of configuration instructions so as to load a modified basic configuration into the automatic branch exchange. To do so, it is possible in particular to proceed as described here above with reference to FIG. 3a.

Figure 4:
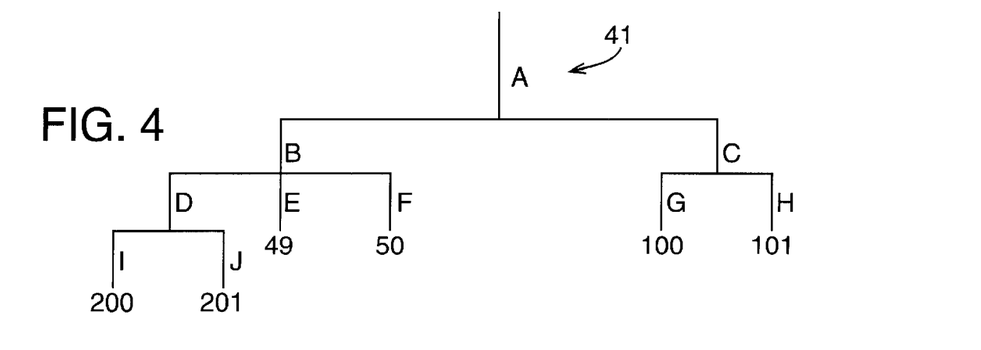
FIG. 4 illustrates a simplified drawing of a particular embodiment of a structure of a configuration of an automatic branch exchange that can be implemented in the method of FIG. 2.

A description shall now be given, with reference to the simplified diagram of FIG. 4, of a structure of a configuration of an automatic branch exchange that can be implemented in the method of management of a telephone automatic branch exchange.

It is assumed that the structure described here below corresponds to the basic configuration of an automatic branch exchange. In other words, this structure corresponds to executable binary data stored in means for the storage of the partial or complete base configuration within an automatic branch exchange or an external management device.

The set from A to J forms an exemplary structure 41 of a configuration attached to an automatic branch exchange. This configuration structure has the appearance of a tree. Indeed, certain of the objects and/or sub-objects are linked to other objects and/or sub-objects.

With a view to simplification, one letter of the alphabet is associated with the objects, sub-objects and parameters of the structure 41 shown. Furthermore, and again with a view to simplification, a number is assigned as a value to characterize each of these parameters.

It is clear that the invention lays down no constraint on the shape of the tree of the structure 41 of configuration of an automatic branch exchange, the number and the nature of the object(s)r the sub-object(s), the parameter(s) as well as the value(s) to be assigned to each parameter.

This example shows an object A characterized by two sub-objects B and C. The first sub-object B is characterized by a sub-object D and two parameters E and E The sub-object D is itself characterized by two parameters I and J, The different parameters I, J, E, F, G and H are each associated with a value 200, 201, 49, 50, 100 and 101 respectively.

Figure 5:
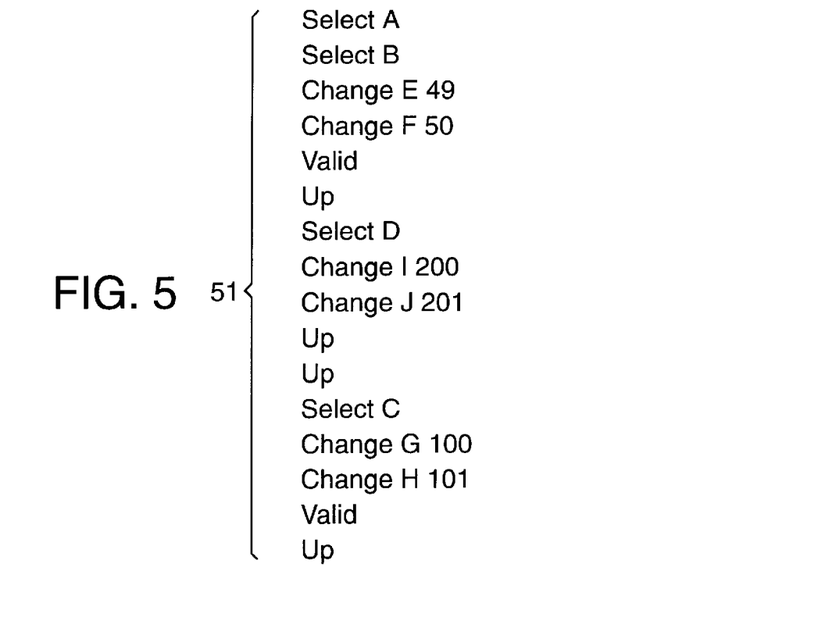
FIG. 5 shows a simplified diagram to explain a particular embodiment of a construction of a diagram of configuration instructions that can be carried out to configure an automatic branch exchange according to the structure of FIG. 4.

A configuration of this kind shall be formalized differently depending on whether it is described in the raw data base exploitable by the management program of the automatic branch exchange (FIG. 6) or in the instructions program giving a condensed descriptive image of the basic configuration (FIG. 5).

These two modalities of formalizing are now described with reference to the appended figures.

Figure 6:
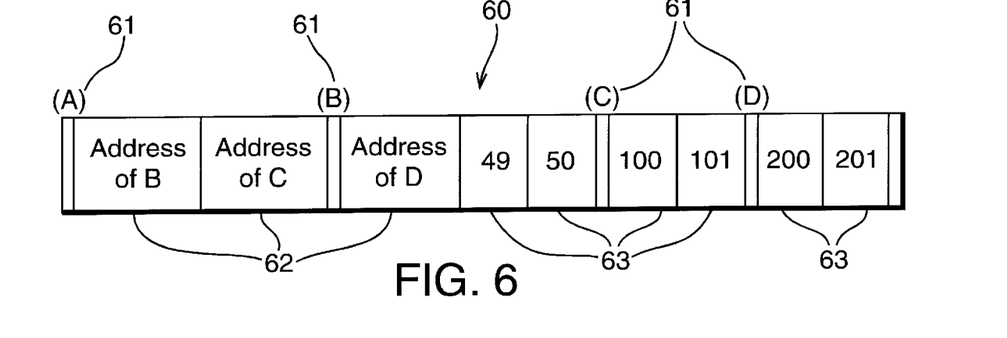
FIG. 6 shows a simplified illustration of a particular embodiment of the contents of the storage means of a basic configuration corresponding to the structure of a configuration of an automatic branch exchange of FIG. 4.

FIG. 6 is a simplified schematic illustration of a possible embodiment of the contents of the storage means of the raw data base corresponding to the structure of a configuration 60 of an automatic branch exchange described with reference to FIG. 4.

According to this symbolic representation, the raw data base of the configuration 60 comprises address zone 61 identifying the memory locations of the object A and of the sub-objects B, C, D (shown with a view to simplification by the associated object or the sub-object between brackets). This raw data base comprises, for each object A and/or sub-object B, C, D, values of the parameters 63 and/or addresses of the objects and/or sub-objects 62 to which the object A is linked within the tree structure, It is precisely a raw data base of this kind that is the object of the phase 22 for the extraction of a configuration diagram representing the basic configuration which, for any management operation, is converted into a diagram of configuration instructions.

With reference to the simplified diagram of FIG. 5, a particular embodiment is now given of a construction of a diagram of configuration instructions of an automatic branch exchange again in correspondence with the tree configuration of FIG. 4.

According to an essential characteristic of the invention, the phase of extraction of a configuration diagram 51 representing the basic configuration essential consists in:
  exploring the basic configuration on all or part of the tree structure 41 so as to prepare a descriptive condensed image of the base configuration, in the form of a diagram 51 of configuration instructions formed by a list of configuration instructions.

This extraction phase is important because it makes it possible to convert the executable binary data representing a part or all of a current basic configuration saved within an automatic branch exchange or an external management device into a diagram 51 of configuration instructions, It is this diagram 51 of configuration instructions which, firstly, undergoes transfers between the external management device and an automatic branch exchange and, secondly, is used as the reference by the manager for any handling on a configuration of an automatic branch exchange.

The configuration instructions forming the diagram 51 of configuration instructions are composed by using a set of available configuration commands. To do this, a restricted number of configuration commands is used. This facilitates the definition of the configuration. These configuration commands are explicit and defined within the external management device and they enable the association, with each object and/or sub-object, of the parameter or parameters that characterize it. The configuration commands comprise in particular:

a command "SELECT" providing for the selection of the object associated with the command "SELECT". In other words, the associated object becomes the current object. This command "SELECT" can also be applied to the sub-object or sub-objects if any of the configuration structure;

a command "CHANGE" modifying the value of the parameter of the object and/or the sub-object associated with the command "CHANGE";

a command "VALID" validating the value or values of the defined parameter or parameters associated with the currently selected object. If the configuration structure comprises one or more sub-objects, the command "VALID" may be applied to the validation of this parameter or parameters of this sub-object or sub-objects;

a command "UP" providing for the de-selection, in the configuration structure, of the currently selected object If the configuration structure comprises one or more sub-objects, the use of this "UP" command for this sub-object or sub-objects prompts a cc upward trace-back , to the level of the previous branching in the tree of the configuration structure. This command is useful especially for taking position within a part of the diagram 51 of configuration instructions to be downloaded or upload.

Furthermore, the diagram 51 of configuration instructions is "modeled" on the structure 41 of the configuration of the automatic branch exchange. In other words, a manager can efficiently define a parameter only after having selected the location of the object or sub-object to which it is attached. The definition of the configuration instructions is therefore simple. This facilitates the analysis and/or interpretation of the corresponding configuration.

More specifically, if the sequence of instructions of FIG. 5 is analyzed, the following commands are recognized:
  "SELECT A" which selects the input point "A" at the-top of the tree;
  "SELECT B" which selects the top "B" of the left-hand branch of the tree of FIG. 4 to begin its exploration, "B" being thus defined as a sub-object of the object "A";
  "CHANGE EU49" which assigns the value 49 to the sub-sub-object "E" depending on the sub-object "B";
  "CHANGE FU50" which assigns the value 50 to the sub-sub-object "F" depending on the sub-object "B";
  "VALID" which closes and validates the sequence of attribution of the values to the two sub-sub-objects of a same level "E" and "F";
  "UP" which enables an upward trace-back from the level of the sub-object "B" to continue the description;
  "SELECT D" to reach the sub-sub-object "D" in order to describe it;
  etc.

The rest of the configuration can be understood by itself by extrapolating the above explanations.

It must be noted that the functions associated with each command as well as the description grammar used may take variants with respect to this example depending on the degree of redundancy sought and the performance characteristics of the interpretation means chosen.

Figure 7:
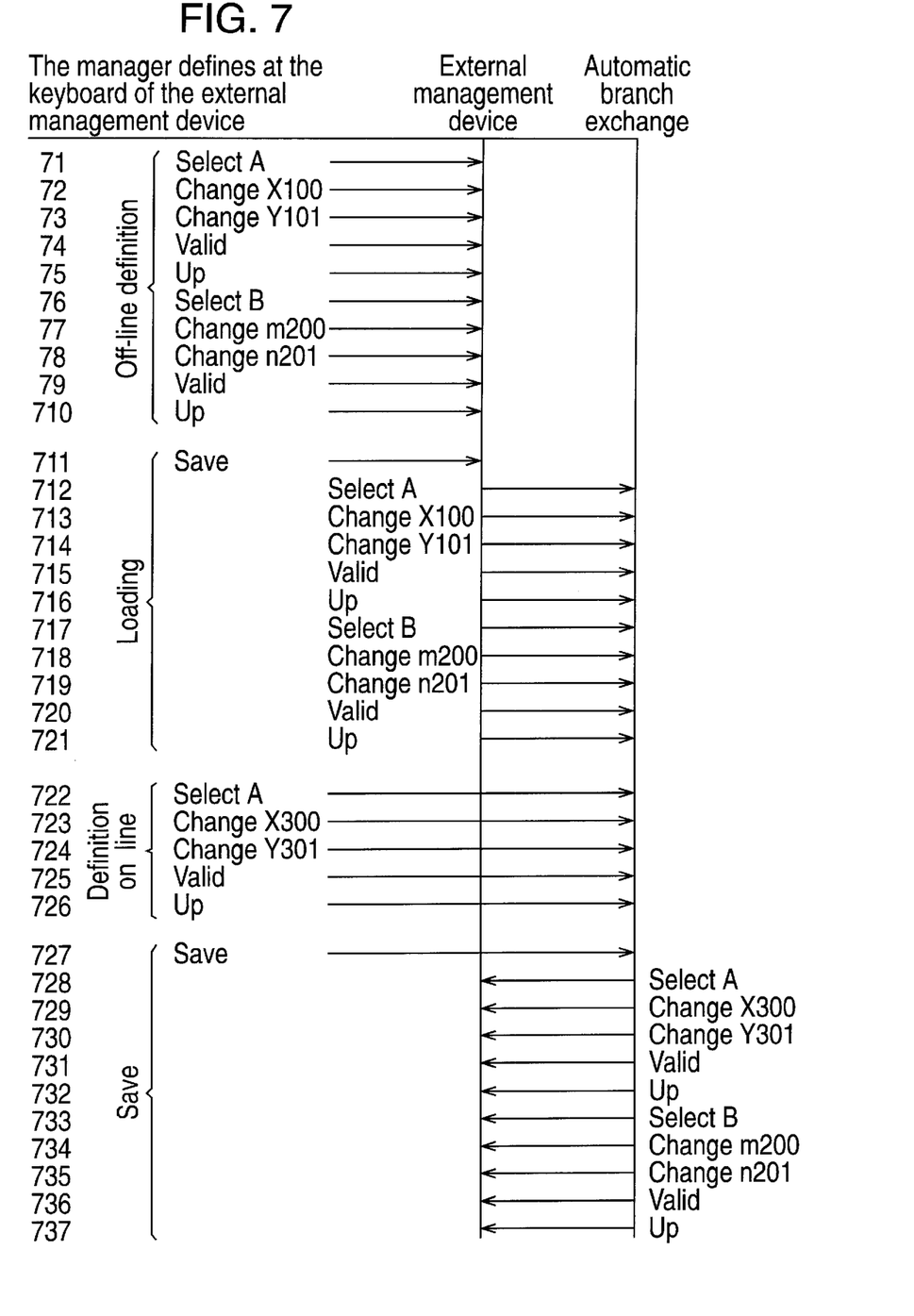
FIG. 7 shows a simplified timing diagram used to explain two particular operating is modes of the method of FIG. 2.

Referring to the timing diagram of FIG. 7, we shall present two particular embodiments of the method of management of a telephone automatic branch exchange.

It is assumed that a manager is seeking to define a configuration on an automatic branch exchange according to a configuration structure comprising two objects A and B, each object being characterized by two parameters x, y, and m, n respectively, the value to be assigned to each of these parameters being respectively 100, 101, 200 and 201.

According to the invention, the manager, off-line and within the external management device, uses the different configuration commands of the set of configuration commands (explained here above with reference to FIG. 5) to define configuration instructions of the steps 71 to 710 corresponding to the desired basic configuration. The manager submits these configuration instructions to the interpretation means 122 (through the means 121 for implementing the management functions), which interpret them and transmit them to the means 123 for reconstituting the basic configuration, which construct the corresponding basic configuration (see FIG. 1). The binary data elements corresponding to this basic configuration are delivered to the means 124 for storage of the basic configuration which stores them (in order to locally preserve the basic configuration). Then, when the manager has succeeded in obtaining the basic configuration desired (after an operation or operations, if any, of local emulation), the manager during the step 711 activates, for a first time, the configuration and transfer macrocommand "SAVE" enabling firstly the construction of the diagram of configuration instructions, corresponding to the current state of the saved basic configuration and secondly the execution of a function of loading this configuration into an automatic branch exchange. The means of implementation of the management functions of the external device interpret and perform the macrocommand. The use of this macrocommand,,during the steps 712 to 721, activates the complete download of the diagram (of configuration instructions) defined from the external device to the automatic branch exchange to be configured. The automatic branch exchange interprets the transfer diagram of configuration instructions and constructs executable binary data so as to establish the image of the corresponding current configuration.

It is now assumed that the manager needs to change certain values of parameters corresponding to a part of the current configuration of the automatic branch exchange.

For this purpose the administrator, when on-line, during steps 722 to 726, defines new configuration instructions which are transferred simultaneously to the definition to the automatic branch exchange. The automatic branch exchange receives the new diagram of instruction(s) and then reconstitutes the executable binary data in order to set up a new image of the current configuration that it implements.

It is now assumed that the manager is seeking to retrieve the diagram of instructions of the current configuration of the automatic branch exchange.

To do so, the manager uses the configuration and transfer macrocommand "SAVE" for a second time during a step referenced 727, within the external management device.

The use of this macrocommand, during the steps 728 to 737, activates the complete uploading of the diagram of instructions of the current configuration of the automatic branch exchange. Following the preparation of the diagram of instructions of the current configuration, the diagram of instructions of the current configuration is transferred from the automatic branch exchange to the external management device. This device interprets the diagram of instructions of the retrieved current configuration and reconstitutes the corresponding executable binary data These binary data elements are then saved in storage means in the form of a complete image of the current configuration of the interrogated automatic branch exchange. In this way, the manager can consult the diagram of configuration instructions and/or locally emulate the working of the automatic branch exchange in question, in order especially to implement and/or modify the corresponding configuration. The configuration that is saved and/or updated and/or modified may be loaded into an automatic branch exchange other than the one from which it comes.

In short, the configuration and transfer macrocommand "SAVE" can therefore fulfill the following two functions:

the preparing of the diagram of configuration instructions on the basis of an exploration of the basic configuration of the automatic branch exchange and the partial or full uploading of the diagram of configuration instructions from the automatic branch exchange to the external management device; and the preparing of the diagram of configuration instructions from an exploration of the basic configuration (stored in the storage means 124) of the external management device and the partial or full downloading of a diagram of configuration instructions from the external device to the automatic branch exchange.

According to one alternative embodiment of the invention, these two functions may also be controlled by two distinct macrocommands if the interpretation means require it Again, the nature of the other commands, the functions associated with them as well as the descriptive grammar illustrated in FIG. 7 may have variants without departing from the scope of the present invention.

What is claimed is:

1. A method for management of a telephone automatic branch exchange (11) in which the telephone automatic branch exchange (11) is provided with a management program that makes use of raw configuration data (62, 63) to ensure operation of said telephone automatic branch exchange (11), the method characterized in that it comprises three main distinct phases of management:

a phase (21) of initialization of a basic configuration (60) for said telephone automatic exchange;

a phase (22) of extraction of a configuration diagram (51) representing said basic configuration (60);

an optional phase (23) for transfer of said configuration diagram (51) from an external management device (12) to said telephone automatic branch exchange (11) or vice versa;

these being phases in which:

said phase (21) of initialization of a basic configuration (60) essentially consists in:

structuring (211) configuration of said telephone automatic branch exchange (11) in a form of a plurality of distinct objects and/or sub-objects each characterized by at least one parameter;

describing (212) in detail said basic configuration (60) in a form of a raw data base that can be exploited by said program for the management of said telephone automatic branch exchange (11);

said phase (22) of extraction of a configuration diagram (51) that represents said basic configuration (60) essentially consists in:

exploring said basic configuration (60) on all or part of said raw data base so as to prepare a descriptive condensed image of said basic configuration (60) in a form of a diagram (51) of configuration instructions constituted by a list of configuration instructions;

said optional transfer phase (23) essentially consists in:
    downloading (231) all or part of said diagram (51) of configuration instructions from said external management device (12) to said telephone automatic branch exchange (11) in order to configure said telephone automatic branch exchange (11); and/or (233)
    preparing (232) and uploading all or a part of said diagram (51) of configuration instructions from said telephone automatic branch exchange (11) to said external management device (12) so as to store a partial or full image of current said basic configuration (60) of said telephone automatic branch exchange (11) in storage means accessible from said external. management device (12).

2. A management method according to claim 1, characterized in that at least some of said objects (A) and/or sub-objects (B) are linked to other said objects and/or sub-objects (B to J) in a tree structure (41).

3. A management method according to claims 2 characterized in that said raw data base, for each object (A) and/or sub-object (B to J), comprises values of said parameters (63) and/or addresses (62) of the objects and/or sub-objects with which said object (A) and/or said sub-object (B to J) is linked within said tree structure (41).

4. A management method according to claim 3, characterized in that said phase (22) of extraction of a configuration diagram (51) representing said basic configuration (60) essentially consists in:
    exploring said basic configuration (60) on all or part of said tree structure (41) so as to prepare a descriptive condensed image of said basic configuration (60) in the form of the diagram (51) of configuration instructions constituted by a list of configuration instructions.

5. A management method according to claim 4, characterized in that;
    there is at least one configuration and transfer macro-command (711, 727) enabling activation of partial or complete said transfer of said diagram (51) of said configuration instructions of said telephone automatic branch exchange (11), from said telephone automatic branch exchange (11) to the device (12) external to said telephone automatic branch exchange (11) or vice versa, in a framework of management functions of said telephone automatic branch exchange (11), belonging to a group comprising:
        functions of loading a configuration into a telephone automatic branch exchange (11);
        functions of saving the current configuration of said telephone automatic branch exchange (11)
        functions of updating the current configuration of said telephone automatic branch exchange (11);
        functions of remote maintenance of the current configuration of said telephone automatic branch exchange (11).

6. A management method according to claim 5 characterized in that, for said functions of loading a configuration into a telephone automatic branch exchange (11), said configuration and transfer macro-command (711, 727) is used to:
    at least partially download said updated diagram (51) of configuration instructions from said external management device (12) to said telephone automatic branch exchange (11);
    reconstitute the basic configuration (60) downloaded from said diagram (51) of configuration instructions so as to load an updated configuration into said telephone automatic branch exchange (11).

7. A management method according to claim 5, characterized in that, for said functions of saving the current configuration of said telephone automatic branch exchange (11), said configuration and transfer macro-command (711, 727) is used to:
    at least partially prepare and upload said diagram (51) of configuration instructions from said telephone automatic branch exchange (11) to said external management device (12);
    reconstitute the basic configuration (60) from said uploaded diagram (51) of configuration instruction and store said reconstituted basic configuration (60) in storage means accessible from said external management device (12).

8. A management method according to claim 5, characterized in that, for said functions of updating the current configuration of said telephone automatic branch exchange (11), said configuration and transfer macro-command (711, 727) is used to:
    at least partially prepare and upload said diagram (51) of configuration instructions from said telephone automatic branch exchange (11) to external management device (12);
    update said diagram (51) of instructions of the current configuration;
    at least partially download said updated diagram (51) of configuration instruction from said external management device (12) to said telephone automatic branch exchange (11);
    reconstitute the basic configuration (60) download from said diagram (51) of configuration instruction so as to load an updated configuration into said telephone automatic branch exchange (11).

9. A management method according to claim 5, characterized in that, for said functions of remote maintenance of the current configuration of said telephone automatic branch exchange (11), said configuration and transfer macro-command (711, 727) is used to:
    at least partially prepare and upload said diagram (51) of configuration instructions from said telephone automatic branch exchange (11) to said external management device (12);
    modify said diagram (51) of instructions of the current configuration as a function of remote maintenance imperatives;
    at least partially download said modified diagram (51) of configuration instructions from said external management device (12) to said telephone automatic branch exchange (11);
    reconstitute the basic configuration (60) downloaded from said downloaded diagram (51) of configuration instructions so as to load a modified configuration into said telephone automatic branch exchange (11).

10. A management method according to claim 5, characterized in that said configuration instructions constituting said diagram (51) of configuration instructions are composed by using a set of available configuration commands, said instructions enabling association, with each of said objects and/or sub-objects, of said at least one parameter characterizing said object and/or sub-object.

11. A management method according to claim 5, characterized in that said configuration instructions of said list of configuration instructions belong to a group comprising:
    a command "SELECT" providing for selection of the object and/or sub-object associated with said command "SELECT";

a command "CHANGE" modifying the value of the parameter of the object and/or sub-object that is currently associated with said command "CHANGE";

a command "VALID" validating the value or values of the defined parameter or parameters associated with currently selected said object and/or sub-object;

a command "UP" providing for de-selection in said structure of the configuration of the currently selected object and/or sub-object.

12. A management method according to claim 11, characterized in that said configuration and transfer macro-command (711. 727) fulfils at least one of the following two functions:

the preparation of said diagram (51) of configuration instructions from an exploration of the basic configuration (60) of said telephone automatic branch exchange (11);

the downloading or the partial or full uploading of said diagram (51) of configuration instructions from said external management device (12) to said telephone automatic branch exchange (11) or vice versa.

13. An external device for the management of a telephone automatic branch exchange (11), characterized in that it further comprises means (121) to implement at least some of said management functions of claim 5.

14. An external management device (12) according to claim 13, characterized in that it furthermore comprises:

means (122) for interpretation, updating and/or-modification of a diagram (51) of current configuration instructions of the telephone automatic branch exchange (11) that is transferred into said external management device (12) by means of said configuration and transfer macro-command (711, 727); and/or means (123) for reconstitution of a part or all of the basic configuration (60) of said telephone automatic branch exchanged (11) from said diagram (51) of configuration instructions, and for updating and/or modification of said reconstituted basic configuration (60);

means (125) for preparing said diagram (51) of configuration instructions, from an exploration of the saved and/or updated and/or modified basic configuration (60) of said telephone automatic branch exchange (11).

15. An external management device (12) according to claim 13 or 14, characterized in that it furthermore comprises means (124) for storage of the partial or complete basic configuration (60) of said telephone automatic branch exchange (11) that is designed to be loaded and/or saved and/or updated and/or modified.

16. An external management device (12) according to claim 15, characterized in that it is connected to a telephone automatic branch exchange (11) through a series link (13) and/or a telephone link and/or an Ethernet link.

17. An external management device (12) according to claim 16, characterized in that it is integrated into a dedicated configuration computer or into another telephone automatic branch exchange (11).

18. An automatic branch exchange (11) implementing said method according to claim 1.

19. An automatic branch exchange (11) implementing said method according to claim 2.

20. An automatic branch exchange (11) implementing said method according to claim 3.

21. An automatic branch exchange (11) implementing said method according to claim 4.

22. An automatic branch exchange (11) implementing said method according to claim 5.

* * * * *